United States Patent [19]
Eade et al.

[11] 3,786,797
[45] Jan. 22, 1974

[54] VALVE SPRING RETAINER LOCKS AND METHOD OF ASSEMBLING ON A VALVE STEM

[75] Inventors: Maurice J. Eade; Charles N. Mellowes, both of Milwaukee, Wis.

[73] Assignee: Charter Manufacturing Company, Inc., Milwaukee, Wis.

[22] Filed: Mar. 31, 1971

[21] Appl. No.: 129,791

[52] U.S. Cl. .................. 123/90.67, 123/188 VA
[51] Int. Cl. ........................... F01l 3/10, F01l 3/00
[58] Field of Search .................. 123/188 VA, 90.67

[56] References Cited
UNITED STATES PATENTS
| | | | |
|---|---|---|---|
| 1,638,251 | 8/1927 | Fisher | 123/90.67 |
| 2,844,134 | 7/1958 | Sietman | 123/90.67 |
| 3,222,770 | 12/1965 | Braid | 123/90.67 |
| 1,965,718 | 7/1934 | Wiley | 123/90.67 |
| 2,171,668 | 9/1939 | Oldham | 123/90.67 |
| R24,928 | 1/1961 | Newton | 123/90.67 |
| 1,857,005 | 5/1932 | Schotthoefer | 123/90.67 |

Primary Examiner—Laurence M. Goodridge
Assistant Examiner—Ronald B. Cox
Attorney, Agent, or Firm—Arthur L. Morsell, Jr.

[57] ABSTRACT

An externally tapered valve spring retainer lock is formed of multiple segments, preferably three in number, which have external circumferential grooves in circumferential alignment to accommodate a yielding ring having separable ends to hold the segments in pre-assembled relationship so that the lock may yield outwardly as it is being slipped onto a valve stem and be held in pre-assembled condition prior to being engaged with the tapered bore of the valve spring retainer. The segments are connected to the ring and maintain the ring in a fixed circumferential position so that one of the end portions of the ring is slideable over a segment during expansion of the lock, with said end so located that it can provide for maximum needed expansion of the lock without having said end enter a joint.

4 Claims, 4 Drawing Figures

PATENTED JAN 22 1974 3,786,797
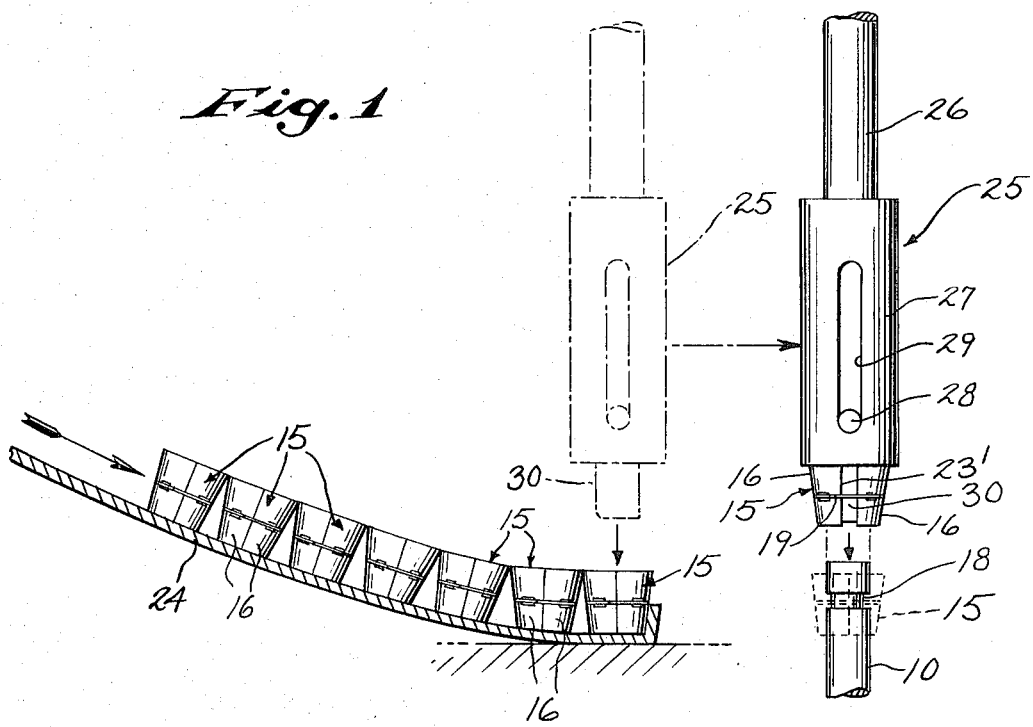
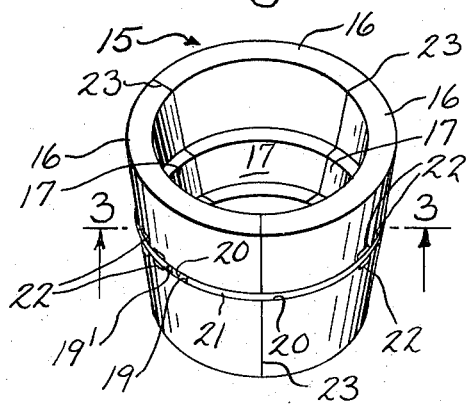
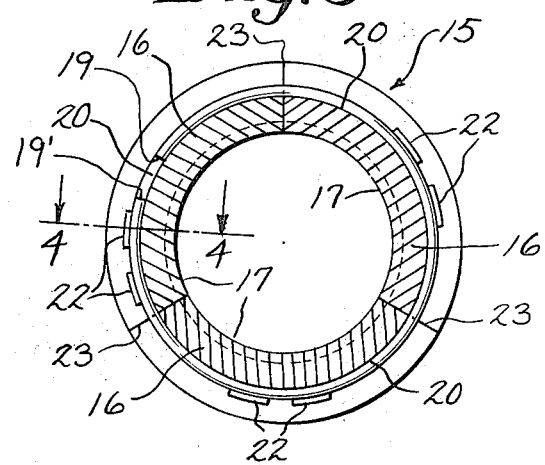
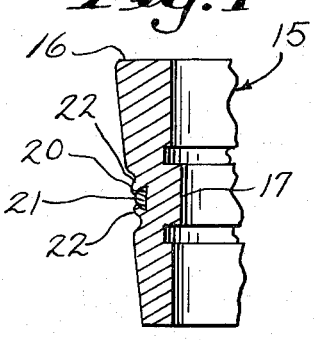
INVENTORS
Maurice J. Eade
Charles H. Mellowes
BY
Mosell & Mosell
ATTORNEYS 3,786,797

VALVE SPRING RETAINER LOCKS AND METHOD OF ASSEMBLING ON A VALVE STEM

BACKGROUND OF THE INVENTION

1. Field of the Invention: The present invention pertains to valve spring retainer locks which are used in valve assemblies in internal combustion engines such as automobile engines.

2. Description of the Prior Art: Heretofore it has been common in valve assemblies to hold the valve spring retainer in position at the outer end of a valve rod by means of split valve locks which have internal circumferential ribs for engagement with a locating and locking groove at the upper end of the valve stem, the split lock being externally tapered to provide a wedging engagement with the tapered bore of the valve spring retainer. With the conventional construction it has been necessary to manually or specially hold the two halves of the lock in position at the upper end of the valve stem while at the same time compressing the spring retainer downwardly against the spring to keep it out of the way. Then, while still holding the two lock pieces, the retainer has been released and allowed to come into wedging engagement with the lock to thereafter wedge it into place. Due to the difficulty of temporarily holding the small lock segments in position on the valve stem, and due to the relatively fast action of the valve spring, it frequently happens that the locks get jammed into imperfectly assembled relationship, or that one of the segments may fall out. This causes costly re-working of the assembly when the error is noticed, with the usual expense and time delays.

In our co-pending application Ser. No. 44,913, filed June 10, 1970 now abandoned, a valve spring retainer lock is described wherein the lock is formed of multiple segments having aligned circumferential grooves arranged to receive a yielding ring with the ring having separable ends. This type of construction is highly satisfactory in use. However, it is conventional practice to ship the locks in bulk in preassembled condition. With the construction of the prior application the ring is not connected to the segments nor are its separable ends permanently oriented in any fixed location with respect to the segments. Thus the rings can slip around on the segments. This slippage sometimes causes problems if the gap between separable ends in the ring comes opposite a joint between segments. This breaks the tie between segments and allows the assembly to collapse and fall inwardly. These collapsed assemblies would therefore either have to be re-assembled or discarded at the point of use.

SUMMARY OF THE INVENTION

The present invention provides an externally tapered valve spring retainer lock which is formed of multiple segments having external circumferential grooves which are circumferentially aligned in assembly and which receive a yielding ring having separable ends. The ring holds the segments in pre-assembled relationship so that the pre-assembled lock may yield outwardly as it is being slipped onto a valve stem and be held in pre-assembled condition thereon prior to being engaged with the tapered bore of the valve spring retainer, there being means for maintaining the ring in a fixed circumferential position with respect to the segments and for tieing the ring to each segment to positively prevent the segments from collapsing inwardly and falling apart during bulk shipment or handling.

A general object of the invention is to provide an improved valve spring retainer lock which ensures proper assembly and eliminates the possibility of jammed locks or missing lock parts.

A further object of the invention is to provide an improved valve spring retainer lock having means for orienting the plural parts of the lock and maintaining them in pre-assembled relationship until they are in fully assembled relationship on the valve stem.

A further object of the invention is to provide an improved method of assembling the valve spring retainer locks on valve stems.

With the above and other objects in view, the invention consists of the improved valve spring retainer lock and method of assembling on a valve stem, and all of its parts, steps and combinations, and all equivalents thereof.

BRIEF DESCRIPTION OF THE DRAWINGS

In the accompanying drawing, illustrating one complete embodiment of the preferred form of the invention, in which the same reference numerals designate the same parts in all of the views:

FIG. 1 is a view, generally in side elevation, but with the feed chute in longitudinal section, showing apparatus for assembling the valve spring retainer locks on valve stems, the insertion tool being shown in a first position in broken lines and in a second position in full lines, and there being a dotted line position showing the valve retainer lock assembled on the end of a valve stem;

FIG. 2 is a perspective view on an exaggerated scale of a pre-assembled valve spring retainer lock;

FIG. 3 is a sectional view taken on the line 3—3 of FIG. 2; and

FIG. 4 is a sectional view taken on the line 4—4 of FIG. 3.

DESCRIPTION OF THE PREFERRED EMBODIMENT

Referring more particularly to the drawing, the improved lock 15 is a sleevelike member comprising a plurality of externally tapered arcuate segments 16 which are usually formed of steel but which may be formed of plastic, and which have the usual circumferential ribs 17 on their inner faces, which ribs are in circumferential alignment when the segments are in assembled relationship to interlock with an annular groove 18 (FIG. 1) near the upper end of a valve stem 10. The inner bore of the assembled lock is cylindrical, but the outer periphery is tapered into frusto-conical form, as shown in FIGS. 2 and 4, to wedgingly coact with the usual tapered bore of a valve spring retainer cap, as is clearly illustrated in our before-mentioned co-pending application.

The outer face of each segment is provided with a circumferential groove 20, the grooves being in circumferential alignment when the segments are in assembled relationship. A yielding ring such as the ring 21 having separable ends 19 and 19' (see FIG. 3), which may be of small gauge wire or of suitable yielding plastic material, is sprung into the grooves 20 to hold the segments in the pre-assembled relationship of FIGS. 2 and 3. The groove is sufficiently deep to accommodate the ring without having it project beyond the exterior surface of the lock.

As an important feature of the present invention the metal of each segment is upset on each side of the ring-receiving groove to provide nubs 22, and the nubs are peened over into clamping position on the wire ring 21. Preferably there are two circumferentially spaced sets of nubs 22 for each segment 16 as is clear from FIG. 3. The clamping action of the nubs is shown more clearly in FIG. 4. This definitely ties each segment 16 to the ring 21 so that the segments cannot collapse inwardly and fall out of assembled relationship. The position of the ring 21 is such, with respect to its separable ends 19 and 19', that the end 19' is clamped in position on one of the segments by the nubs 22 while the juxtaposed end 19 is positioned sufficiently far from the segment joint 23 that, upon expansion of the lock as it is forced onto a .345 inch diameter stem 10, the end 19 will slide circumferentially on its segment but not as far as the joint 23 even at the widest point of expansion. On the right-hand side of FIG. 1 the lock is shown in expanded condition on the transfer tool and it will be seen that the end 19 of the ring is short of the edge 23' at the joint. With this arrangement, after the retainer lock is installed in the dotted line position of FIG. 1 on the valve stem 10, the end 19 will readily slide back to its normal position as the outer circumference of the lock contracts.

FIG. 1 illustrates improved method of installing the improved retainer locks which may be accomplished either by hand or by use of the tool illustrated. Here there is a chute 24 down which the retainer locks may be delivered by gravity. A transfer tool, designated generally by the numeral 25, has a stem or plunger 26 slideable through a sleeve 27, there being a pin 28 on the plunger which moves in a slot 29 of the sleeve to limit downward movement of the stem in the sleeve. The plunger is the same diameter as the valve stem 10 — that is, .345 of an inch in the preferred embodiment.

The tool may be suitably supported in any desired manner or may be manipulated by hand. With the tool in the left-hand broken-line position of FIG. 1 it is lowered until the projecting portion 30 of the plunger 26 enters the bore of the endmost retainer lock 15 in the chute. The lower end of the plunger 30 is rounded and as it hits the internal rib 17 it causes an expansion of the lock with a spread of the gap between two of the segments as shown on the right-hand portion of FIG. 1 where the edge 23' of one segment is expanded away from the adjacent end of the next segment. With the retainer lock thus held on the stem end 30 by its expanded ring 21, the transfer tool 25 is elevated and then moved laterally to the full line position of FIG. 1 over a valve stem 10. The tool is then lowered as indicated by the arrow in FIG. 1 until the lower end of the plunger 30 abuts the upper end of the valve stem 10. Then the sleeve 27 is caused to move downwardly relative to the stem 26. This causes sliding of the retainer ring off of the tool and onto the upper end of the valve stem 10 until the internal rib 17 of the lock snaps into the groove 18 of the valve stem. When this occurs the yielding ring 21 causes the gap at 23' to close and the retainer ring is then fully assembled on the valve stem. It is to be understood that this assembly on the valve stem will be performed while the valve stem retainer cap and valve spring are in compressed condition on the valve stem 10, as is fully described in our co-pending application.

It is apparent from the above that because the segments are tied to the ring 21 in their pre-assembled position there is no possibility of the segments falling inwardly and collapsing during bulk shipment or handling. It is also apparent that the arrangement has been so worked out that the ring 21 is in a fixed circumferential condition on the retainer lock so that its end 19 is too far from the joint 23 to pass beyond the edge 23' when the retainer lock is in the expanded condition shown on the full line position of the tool in FIG. 1.

While the three-segment lock illustrated is preferred, nevertheless it is possible to employ a two-segment lock as shown in FIG. 7 of our co-pending application, with each segment having nubs such as the nubs 22 peened over into clamping engagement with the ring 21.

From the above it is also apparent that with the present invention there is no need to manually hold segments in position at the top of a valve stem while at the same time holding the spring compressed, with the attendant danger of parts being displaced to produce a jammed lock or a lock with missing parts. With the present invention, proper assembly is ensured, as the parts of the lock are kept in proper oriented relationship with one another while in the pre-assembled condition of FIG. 2, and the use of the surrounding yielding ring 21 allows sufficient give to permit slipping the lock onto the valve stem 10 while still retaining the pre-assembled form. Thereafter the lock is self-retained in proper position pending wedging coaction with the spring retainer of the valve stem assembly.

We wish it to be understood that we do not desire to be limited to the exact details of construction shown and described, for obvious modifications will occur to a person skilled in the art.

What we claim is:

1. A valve spring retainer lock comprising a sleeve-like member adapted to fit on a valve stem of the type having an annular groove, said lock being formed of a plurality of arcuate segments, each having an internal circumferential rib for engagement in said groove of a valve stem, wherein the improvement comprises: having external, circumferentially-aligned peripheral grooves on the arcuate segments, a yielding ring having separable ends and engaged with said grooves for holding the segments in preassembled relationship with one another while allowing for expansion of the retainer lock, the peripheral grooves being of a depth to receive the yielding ring, and nubs on each segment which are peened over to clamp the segment to the ring while the ring is in the groove.

2. A valve spring retainer lock as claimed in claim 1 in which there are nubs on both sides of the peripheral grooves which are peened toward one another over the ring.

3. A valve spring retainer lock comprising a sleeve-like member adapted to fit on a valve stem of the type having an annular groove, said lock being formed of a plurality of initially separate arcuate segments, each having an internal circumferential rib for engagement in said groove of a valve stem, wherein the improvement comprises: having external retaining means on the arcuate segments intermediate the height thereof, a yielding ring having separable ends engaged with said retaining means and surrounding said segments to hold the latter in preassembled relationship with one another while allowing for expansion of the retainer lock, and means for anchoring each segment to said ring in predetermined relationship therewith while leaving one separable end portion of the ring free for sliding movement on a segment as the lock is expanded, said last means orienting one of the separable ends of the ring in such a location that said end slideably overlaps a portion of one segment so as to allow for expansion of the lock without having said last-mentioned separable end of the ring pass beyond the edge of the segment on which it slides, the opposite end of the ring being anchored to said last-mentioned segment to hold said segment in assembled relationship.

4. A valve spring retainer lock as claimed in claim 3 in which there are three segments.

* * * * *